(12) United States Patent
Knas et al.

(10) Patent No.: US 10,735,193 B1
(45) Date of Patent: Aug. 4, 2020

(54) DECENTRALIZED ENCRYPTION AND DECRYPTION OF BLOCKCHAIN DATA

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US); Krzysztof Gibadlo, Springfield, MA (US); Rick Ferry, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 246 days.

(21) Appl. No.: 15/995,020

(22) Filed: May 31, 2018

Related U.S. Application Data

(60) Provisional application No. 62/513,868, filed on Jun. 1, 2017.

(51) Int. Cl.
*H04L 9/00* (2006.01)
*H04L 9/08* (2006.01)
*H04L 29/06* (2006.01)

(52) U.S. Cl.
CPC .......... *H04L 9/0894* (2013.01); *H04L 9/0861* (2013.01); *H04L 63/0428* (2013.01)

(58) Field of Classification Search
CPC ..................................................... H04L 9/0894
See application file for complete search history.

(56) References Cited

U.S. PATENT DOCUMENTS

| | | | |
|---|---|---|---|
| 10,373,158 B1 * | 8/2019 | James | G06Q 20/3829 |
| 2016/0342977 A1 * | 11/2016 | Lam | G06Q 20/02 |
| 2017/0116693 A1 * | 4/2017 | Rae | G06Q 20/3827 |
| 2017/0228731 A1 * | 8/2017 | Sheng | G06Q 20/401 |

* cited by examiner

*Primary Examiner* — Josnel Jeudy
(74) *Attorney, Agent, or Firm* — Foley & Lardner LLP

(57) ABSTRACT

Methods and systems disclosed herein generate a secure blockchain key for a user by generating a blockchain key comprising a string of alphanumerical and/or character values; generating one or more key segments by dividing the key string in to a number of sub-strings based on a first encryption method; encrypting each sub-string based on a second encryption method; determining a latest valid blockchain associated with the user; identifying a group of network nodes associated with the latest valid blockchain; selecting a number of network nodes from the identified group of network nodes; and instructing the selected network nodes to store the encrypted key segments.

20 Claims, 5 Drawing Sheets

DECENTRALIZED ENCRYPTION AND DECRYPTION OF BLOCKCHAIN DATA

CROSS-REFERENCE TO RELATED APPLICATIONS

This application claims priority to U.S. Provisional Application No. 62/513,868 filed Jun. 1, 2017, which is hereby incorporated by reference in its entirety.

TECHNICAL FIELD

This application generally relates to decentralized encryption and decryption of data.

BACKGROUND

As the processing power of computers allow for greater computer functionality and the Internet and network technology era allows for interconnectivity between computing systems, many institutions utilize computer technology to store highly sensitive data. To achieve highly-secure data storage, many institutions utilize blockchain technology. However, since the implementation of this sophisticated computer tool (e.g., blockchains), several technical shortcomings have been identified and have created a new set of challenges.

Conventional and existing software solutions have failed to provide a method to generate and/or retrieve secure blockchain keys. A blockchain key is a unique identifier that grants user access to data stored within a blockchain. Each network node associated with a blockchain may have a unique and private key, which allows the network node to access and view certain portions of the data embedded within the blockchain. Existing and conventional software solutions have failed to generate a secure blockchain key and have failed to provide fast and efficient ways to retrieve the blockchain key, if lost.

Currently, if a user loses his or her blockchain key the user may be required to utilize a third party to recreate the blockchain key. This has proven to be ineffective and unsecure because the third party is now in possession of the user's private key or other sensitive data. This may allow the third party to freely access data uniquely encrypted for the user, which is an undesirable but unavoidable consequence. As a security measure, many institutions store the blockchain keys in an internal database and allow users to retrieve their blockchain keys similar to retrieving passwords (e.g., by providing answers to predetermined questions). This method is also unsecure because an internal database may be subjected to cyber-attacks and the content of the database (e.g., the users' blockchain keys) may be accessed by a hostile third-party.

SUMMARY

For the aforementioned reasons, there is a need for a more accurate system and method, which would allow a blockchain key to be stored safely and retrieved securely. Disclosed herein are systems and methods for dynamic encryption and decryption of blockchain keys. Even though certain embodiments herein have been described in terms of blockchain keys, the methods and systems disclosed herein are not limited to blockchain keys. The methods and systems disclosed herein can be applied to encryption and decryption of any data in a decentralized manner.

Distributed databases such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. Using the advantages described above, the methods and systems described herein can ensure the integrity of blockchain keys. As used herein, blockchain key may refer to a user's private or public key.

In an embodiment, an encryption method comprises generating, by a server, a blockchain key configured to provide access to a set of data associated with a blockchain, the blockchain key comprising a first string of alpha numerical and character values; generating, by the server, a plurality of key segments by dividing, based on a first encryption method, the first string of alpha numerical and character values into a plurality of second strings, each second string comprising at least a portion of the first string of alpha numerical and character values; encrypting, by the server, each key segment based on a second encryption method; retrieving, by the server, a latest valid blockchain from a plurality of network nodes associated with the blockchain, the latest valid blockchain comprising one or more block instances comprising blockchain data and a corresponding cryptographic hash value, each block instance stored in a database associated with at least one of the plurality of network nodes; generating, by the server, an instruction to store at least one of the plurality of the encrypted key segments; and transmitting, by the server, the instruction and at least one encrypted key segment to at least one network node.

In another embodiment, a computer system for data encryption comprises a plurality of network nodes, each network node configured to store a block instance of a blockchain; a server communicatively coupled to each network node, the server configured to: generate a blockchain key configured to provide access to a set of data associated with the blockchain, the blockchain key comprising a first string of alpha numerical and character values; generate a plurality of key segments by dividing, based on a first encryption method, the first string of alpha numerical and character values into a plurality of second strings, each second string comprising at least a portion of the first string of alpha numerical and character values; encrypt each key segment based on a second encryption method; retrieve a latest valid blockchain from the plurality of network nodes associated with the blockchain, the latest valid blockchain comprising one or more block instances comprising blockchain data and a corresponding cryptographic hash value, each block instance stored in a database associated with at least one of the plurality of network nodes; generate an instruction to store at least one of the plurality of the encrypted key segments; and transmit the instruction and at least one encrypted key segment to at least one network node.

In another embodiment, a computer-implemented method comprises receiving, by a server, from an electronic device, a request to retrieve a blockchain key associated with a user; in response to displaying an authentication request, receiving, by the server via the electronic device, one or more authentication inputs; upon the one or more authentication inputs matching a predetermined authentication record in a system database, retrieving, by the server, a key record comprising a first encryption method, a second encryption method, and a set of network nodes of a blockchain; identifying, by the server, a subset of network nodes, each network node within the subset of network nodes storing at least one encrypted key segment of a plurality of key segments; retrieving, by the server, a plurality of encrypted key segments from the subset of network nodes; decrypting, by the server, each encrypted key based on the first encryption method; generating, by the server, the blockchain key by appending the decrypted key segments based on the second encryption method; and transmitting, by the server, the blockchain key to the electronic device.

In yet another embodiment, a computer system comprises a plurality of network nodes, each network node configured to store a block instance of a blockchain; a server communicatively coupled to each network node, the server configured to receive, from an electronic device, a request to retrieve a blockchain key associated with a user; in response to displaying an authentication request, receive, via the electronic device, one or more authentication inputs; upon the one or more authentication inputs matching a predetermined authentication record in a system database, retrieve a key record comprising a first encryption method, a second encryption method, and a set of network nodes of a blockchain; identify a subset of network nodes, each network node within the subset of network nodes storing at least one encrypted key segment of a plurality of key segments; retrieve a plurality of encrypted key segments from the subset of network nodes; decrypt each encrypted key based on the first encryption method; generate the blockchain key by appending the decrypted key segments based on the second encryption method; and transmit the blockchain key to the electronic device.

It is to be understood that both the foregoing general description and the following detailed description are illustrative and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
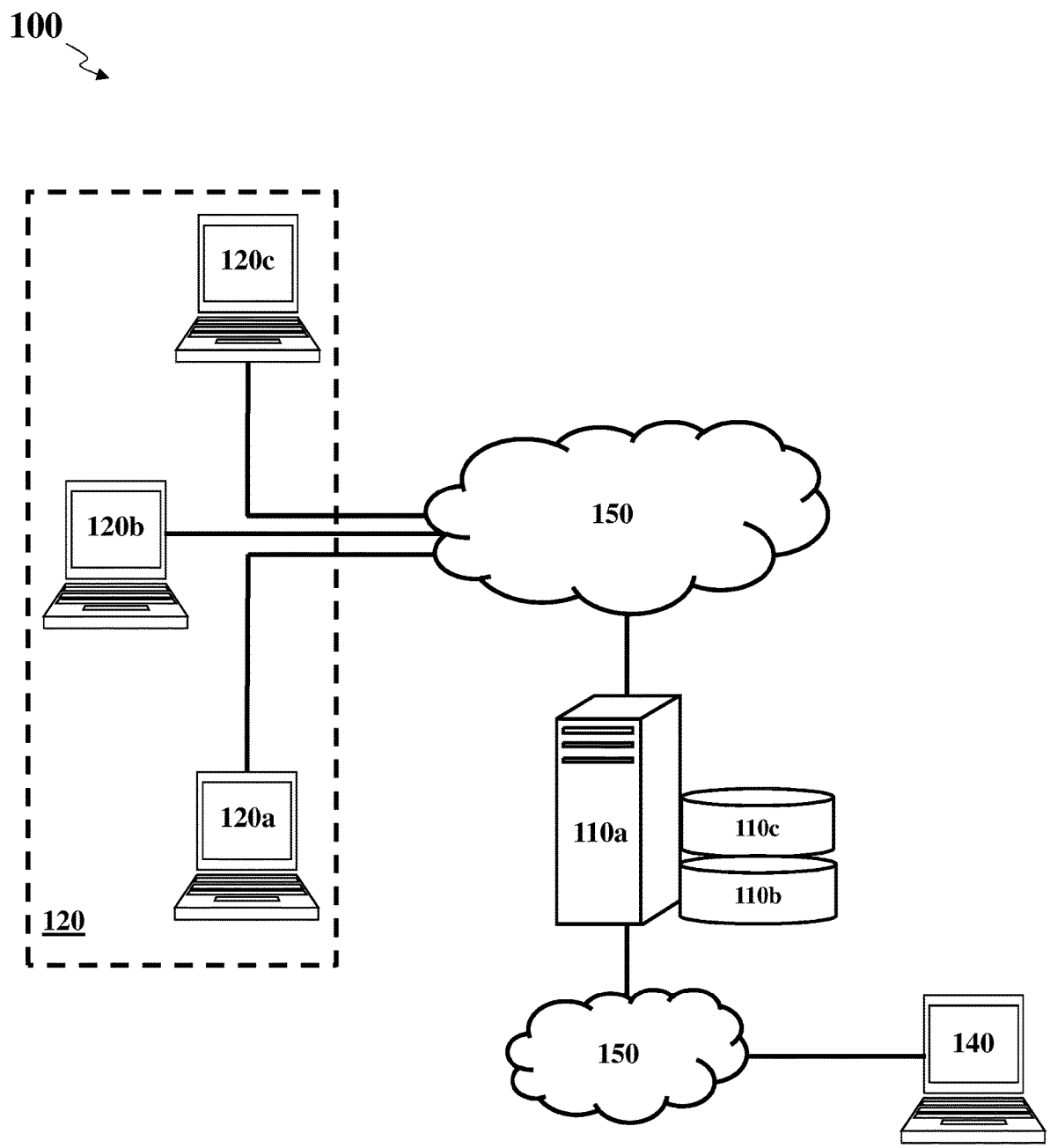
FIG. 1 illustrates an example of a computer system for generating and retrieving a secure blockchain keys, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates components of a system 100 for generating a secure blockchain key, according to an embodiment. The system 100 may comprise an analytics server 110a, system database 110b, a key storage database 110c, a client device 140, and distributed network nodes 120a-c. Aspects of the system 100 may be configured to employ and manage a system blockchain, sometimes referred to in the art as a "distributed ledger," and may include and/or utilize blockchain-based distributed ledger software (e.g., Hyperledger, Ethereum, Openchain, and TerraLedger) or a homegrown equivalent. The system blockchain may operate as a distributed database that stores data records associated with users and transaction documents, where the data records stored on the system blockchain may be blocks of data (e.g., block instances) that are hosted (or locally stored) on distributed network nodes 120a-c.

Each block may not be accessible to one or more network nodes, however the analytics server 110a may access all block instances. The analytics server 110a may also store any block instance in the system database 110b. In some configurations, data stored within the system databases 110b may vary from the data stored in blocks of the system blockchain hosted on network nodes 120a-c. In some configurations, the analytics server 110a may generate a duplicate of one or more block instances within a blockchain and store said block instances in the system database 110b. While the analytics server 110a may dictate accessibility and transmit instructions to other parties within system 100, each network node within the distributed network nodes 120a-c (e.g., creator of the block instance) or the client (via the client device 140) may prevent others within system 100 from accessing at least portions of the data within one or more block instances.

An analytics server 110a may generate and display a user interface on the client device 140 and/or each node within the distributed network nodes 120a-c. An example of the user interface generated and hosted by the analytics server 110a may be a website. The analytics server 110a may host a website accessible to the end-users (e.g., users associated with each network node or the client computing devices), where the content presented via the various webpages may be controlled based upon each particular user's role.

The analytics server 110a may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single analytics server 110a, in some embodiments the analytics server 110a may include any number of computing devices operating in a distributed computing environment. In some embodiments, all functions performed by the analytics server may be collectively performed by the network nodes.

The analytics server 110a may execute software applications configured to display the user interface (e.g., host a website), which may generate and serve various webpages to client device 140 or each network node within the distributed network nodes 120a-c. Different network nodes and/or an operator associated with the analytics server 110a may use the website to generate and access data stored on a system database 110b or a blockchain hosted by nodes 120a-c and managed by the analytics server 110a. In some configurations, the analytics server 110a may be configured to require user authentication based upon a set of user authorization credentials (e.g., username, password, biometrics, cryptographic certificate, and/or a blockchain key). In such implementations, the analytics server 110a may access a system database 110b configured to store user credentials, which the analytics server 110a may be configured to reference in order to determine whether a set of entered credentials (purportedly authenticating the user) match an appropriate set of credentials that identify and authenticate the user.

In some configurations, the analytics server 110a may generate and serve webpages to a client device 140 based upon the client's role within the system 100 (e.g., administrator or a user with limited or partial access to the data within the blockchain). In such implementations, the user's role may be defined by data fields and input fields in user records stored in the system database 110b. Authentication of user and their roles may be conducted by the analytics server 110a by executing an access directory protocol (e.g. LDAP). Upon proper authentication, the analytics server 110a may generate webpage content, access or generate data stored in the system database 110b, and access or generate data stored in the blockchain instances, according to the user's role defined by the user record in the system database 110b.

The analytics server 110a may also generate, access, and update blockchain instances hosted on system nodes 120a-c, in accordance with instructions received from a client device 140, or any of the nodes within the system nodes 120a-c. Software executed by the analytics server 110a may provide blockchain services to users interacting with the analytics server 110a. For example, the analytics server 110a may render blockchain services to the client device 140 or nodes 120a-c via the user interface provided. In some embodiments, the analytics server 110a may update and query records in the system database 110b according to the instructions received from the client device 140 or any other network node. The analytics server 110a may then generate block instances for the system blockchain, where the block instances contain data from the records of the system database 110b.

The application server may then update a local instance of the system database 110b, and subsequently instruct network nodes 120a-c to update the instances of the system blockchain stored locally on each of the network nodes 120a-c. The analytics server 110a may generate each new block instance with a timestamp or other data that links the new block instance with existing block instances on the blockchain. As an example, when the analytics server 110a generates a new user record in the system database 110b, the analytics server 110a then generates a hash value for the user based upon one or more data fields of the user record. The analytics server 110a then generates a new block instance for the system blockchain within the local instance of the blockchain stored in the analytics server 110a (or a database associated with the analytics server 110a). The analytics server 110a then transmits the updated block instance to each respective network node 120a-c. The network nodes 120a-c, in turn, may update the local instances of the blockchain stored on each of the network nodes 120a-c.

In operation, when a user instructs the analytics server 110a to conduct a service, the analytics server 110a may conduct a poll of the network nodes 120a-c and/or the client device 140 to retrieve a copy of the latest blockchain stored on each network node 120a-c. The analytics server 110a may then await a response from a predetermined quorum of network nodes 120a-c, or the client device 140 to confirm the data in the blocks. For instance, if a pre-determined number (or percentage) of the network nodes 120a-c transmit the same data, the analytics server may assume that the retrieved data is the latest valid blockchain. In some configurations, a pre-determined number of quorums may always not be necessary to proceed. For example, when the analytics server receives an instruction from the client device 140 to update a blockchain associated with a previous content owner/network node (stored in node 120b), the analytics server may await receipt of approval from 120b even if a quorum is met.

The analytics server 110a may generate block addresses for data to be retrieved from blockchain instances of the system blockchain. For instance, machine-readable computer files containing various forms of documents (e.g., PDF, DOC, and XLS) may be uploaded and stored into the system database 110b to be inserted into the blockchain. The analytics server 110a may generate a cryptographic hash value of the document, where the application uses the hash value or other identifiers to reference the file from the system database 110b. The analytics server 110a may then generate the block address for the file by generating a cryptographic hash value of the document and a hash value of the immediately preceding block data or block address. This block address may then be stored into the system database 110b in a document record along with the file and any number of additional data field entries related to the computer file. This concept is further described in FIG. 3.

In operation, the analytics server 110a or network nodes 120a-c may reference the block within the blockchain containing the file according to the block address. The analytics server 110a may generate additional blocks and corresponding block addresses on the system blockchain in a similar manner (e.g., generating a hash value for a block containing user data and then generating a new block address using the block address of the preceding block). The block addresses may be generated in any number of combinations of hashed block data and/or hashed block addresses from the new block and one or more preceding blocks, such that the address of the new block is dependent upon, or otherwise linked to, at least the immediately preceding block.

In some implementations, a system blockchain may contain data regarding a client using the client device 140. The analytics server 110a may manage the blockchain, where each block instance within the blockchain represents content pertinent to the user. Non-limiting examples of what may be stored in the system database 110b may include: user records that may comprise data fields describing users (e.g., user data), such as user credentials (e.g., username, passwords, biometrics, encryption certificates), block addresses for blocks on the system blockchain, user account data, user roles or user permissions; document records that may comprise machine-readable computer files (e.g., word processing files); and application data that may include software instructions executed by an analytics server 110a or data used by the such applications executed by the analytics server 110a.

User records stored on the system database 110b may comprise a data field containing a user-identifying hash value generated by the analytics server 110a according to a hashing algorithm implemented by a system blockchain, when a new user record is generated or updated. The analytics server 110a may generate (or instruct a third-party to generate) the cryptographic hash value using one or more data fields that describe the user, which may be entered by a user via a website portal or pulled from the user record in the system database 110b. The hash value may be a unique identifier for the particular user record, and may be used by various computing devices of the system 100 to reference the user data, which may be stored in the system database 110b and/or on blocks of the system blockchain that is hosted on network nodes 120a-c. The system database 110b may be hosted on any number computing devices comprising a non-transitory machine-readable storage medium and capable of performing the various tasks described herein. As shown in FIG. 1, the analytics server 110a may access the system database 110b via one or more networks.

Document records stored on the system database 110b may comprise a data field containing document-identifying hash values generated by the analytics server 110a according to a hashing algorithm implemented by a system blockchain, when a new document record containing a machine-readable computer file (e.g., PDF, DOC, and XSL) is generated or updated. The hash value may be generated using one or more data fields that describe the computer file, which may be uploaded by a user via a website portal or pulled from the document record within the system database 110b. The hash value may be a unique identifier for the particular document record, and may be used by various computing devices of the system 100, such as the system database 110b, to reference the computer file or metadata describing the computer file, which may be stored in the system database 110b and/or on block instance of the system blockchain that is hosted on network nodes 120a-c.

A key storage database 110c, sometimes referred in the art as a high security module, key appliance, certificate authority, or the like, may be a computing device configured to manage and distribute encryption keys and cryptographic certificates to various computing devices in the system 100 according to predetermined roles and rules. In some implementations, encryption keys may be used for authentication of users when users log into a website (or any other user interface provided to the users) hosted on the analytics server 110a. In some implementations, the analytics server 110a may use different (or the same) encryption keys to encrypt the data within the block instance of the system blockchain.

Additionally or alternatively, the analytics server 110a may use different (or the same) encryption keys to confirm, or "sign," data transfers to confirm to a data transfer recipient that the data originated from a known party. The key storage database 110c may be hosted on any number of computing devices comprising a non-transitory machine-readable storage medium and capable of performing the various tasks described herein. As shown in FIG. 1, the analytics server 110a may access the key storage database 110c via one or more networks, but the key storage database 110c may also be accessed by the client device 140 (with permission of the analytics server 110a) and network nodes 120a-c to retrieve or confirm encryption keys or encryption key signatures. The key storage database 110c may be hosted on the same physical computing device functioning as the analytics server 110a and/or an analytics server 110a.

Network nodes 120a-c may represent an institution relevant to the user and may host one or more blocks of the system blockchain. A network node 120a-c may be any computing device comprising a processor and a non-transitory machine-readable storage medium capable of performing the various tasks and processes described herein. Non-limiting examples of a network node may be a workstation computer, laptop computer, tablet computer, and server computer. Although the network nodes 120a-c are described as storing blocks of the blockchain in FIG. 1, other computing devices, such as an analytics server 110a, may host blocks of the blockchain. Each network node 120a-c locally stores an instance of the system blockchain in the storage medium of the system blockchain, and further executes a software application that instructs the network node 120a-c on generating and querying blocks within the locally stored blockchain instance. In an embodiment, each network node 120a-c may represent a computer owned by each user within the blockchain.

In operation, a network node may generate new blocks on a locally stored instance of the system blockchain according to data received from an analytics server 110a or other network nodes 120a-c. In some instances, the analytics server 110a may update a local block instance stored on the analytics server 110a (e.g., within the system database 110b), and then instructs one or more of the network nodes 120a-c to update each block instance stored in their local storage (e.g., local database). Moreover, the analytics server 110a may query the block instances of the system blockchain according to a block address stored in the system database 110b. When the analytics server 110a executes the query of the blocks on the system blockchain, the analytics server 110a may poll the network nodes 120a-c to determine the most recent data on the system blockchain (e.g., latest valid blockchain). The analytics server 110a may be confident that the data at block is the desired data according to a voting mechanism encoded within the blockchain software executed by the network nodes 120a-c. Each network node 120a-c may receive the query for the block instance and block address, and return a response to the analytics server 110a indicating whether the block address contains the desired data. The analytics server 110a may select this method to combat possible fraud and to be certain that data in the blockchain is resistant to corruption, as each block instance on each network node 120a-c would need to be corrupted in the same way so that each block address is corrupted in the same way. Similarly, in this way, the analytics server 110a may be prevented from acting on obsolete data. For instance, a network node 120a-c may attempt to modify user's information. By modifying the information within the block instance, the hash value of said block instance may change, which would result in the block instance being disconnected from other block instances within the blockchain.

A client device 140 may be any computing device allowing a user to interact with analytics server 110a via analytics server 110a. The client device 140 may execute an Internet browser or local application that access the analytics server 110a in order to issue requests or instructions to the analytics server 110a to access the system blockchain (e.g., transmit instructions to the analytics server 110a). The client device 140 may transmit credentials from user inputs to the analytics server 110a, from which the analytics server 110a may authenticate the user and/or determine a user role. The client device 140 may comprise any number of input devices configured to receive any number of data inputs, including various types of data inputs allowing for authentication (e.g., username, passwords, certificates, and biometrics). The client device 140 may be any computing device comprising a processor and non-transitory machine-readable storage medium allowing the client device 140 to perform the various tasks and processes described herein.

As an example of the client device 140 operation, the client device 140 may execute an Internet browser that accesses the analytics server 110a hosting a website (or any other user interface) that allows the user to access and/or manage his/her blockchain. The client devices 140 may be used upload machine-readable computer files (e.g., PDF, DOC, XSL) containing user's information. The computer files may be stored into document records in a system database 110b, which may then be added to block instances of the system blockchain, where the block instances are accessible according to block addresses that are then stored into the document record for the particular computer file. The client device 140 may issue queries or instructions to the analytics server 110a via the webpages generated by the analytics server 110a, which then instruct the analytics server 110a to query the block instances on the network nodes 120a-c, and, in some instances, perform various tasks, such as retrieving or updating a file from the system database 110b.

Figure 2:
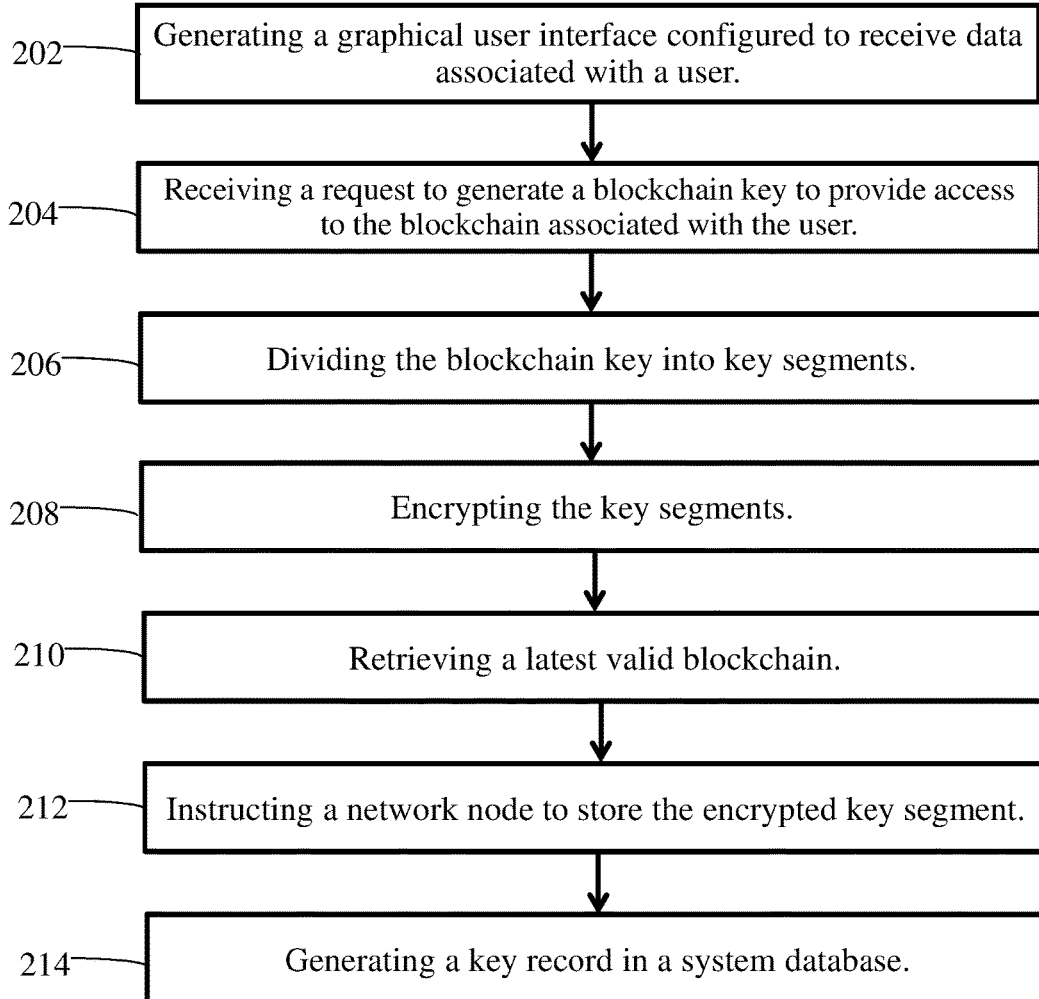
FIG. 2 illustrates a flowchart depicting operational steps for generating secure blockchain keys, according to an embodiment.

FIG. 2 illustrates execution of a method 200 for generating a secure blockchain key, according to an embodiment. Other embodiments may comprise additional or alternative steps, or may omit some steps altogether.

At step 202, the analytics server may generate a graphical user interface comprising a plurality of input fields configured to receive data associated with a user. The analytics server may generate a graphical user interface in order to provide blockchain services to a variety of different clients. In an embodiment, the graphical user interface may be a website hosted by the analytics server, which is available to different clients. The purpose of said website may be to collect user's information, provide a platform to securely upload pertinent data, and/or possibly retrieve the user's data from the website or another data source. The graphical user interface may act as an intermediary between different parties involved within the user's blockchain and may be a central and "one stop" place for adding, updating, and/or retrieving user's data within a blockchain.

In an embodiment, the analytics server manages a blockchain associated with the user's financial information (e.g., financial blockchain). The user and other network nodes (e.g., different financial institutes) may have access to the website provided by the analytics server in order to update and/or modify user's blockchain. While the graphical user interface is described as a central management tool, neither the analytics server nor the graphical user interface deviates from the spirit of the distributed nature of the blockchain technology.

At step 204, the analytics server may receive a request to generate a secure blockchain key associated with the user's blockchain. In some embodiments, the user (operating the client computing device) may log into the website hosted by the analytics server to request generating a secure blockchain key. Upon receiving the request, the analytics server may generate a key for the user and display the blockchain key on the user interface. A blockchain key may be defined as a secret code, passcode, or a password, which allows a network node associated with each block instance to prove ownership and access certain data within a blockchain. In some configurations, each network node's access to data is defined based on their respective blockchain key. For instance, a blockchain key is necessary to be authenticated to enter a platform supporting the blockchain. The key may also be necessary for a network node to access data, which that particular network node is authorized to access, within a blockchain. For instance, the key may also be necessary for the analytics server to decrypt certain data stored within the blockchain and present the decrypted data to the user.

Even though all network nodes may possess the blockchain, not all network nodes may access the data within the blockchain. The analytics server may generate a customized encryption based on a network node's selection of data. For example, the administrator using the second computing device may designate the information within a block instance as public. In those embodiments, the analytics server may transmit the data to the all the other network nodes associated with the blockchain (e.g., first computing device) or make the data within the second block instance readily available to all the nodes associated with the blockchain or any other computing device in possession of the blockchain address. All network nodes may freely share the public information stored within the blockchain.

On the other hand, a network node may designate a portion (or all) of the data in a block instance as private. In those embodiments, the analytics server may encrypt the data using the network node's public key. The above-mentioned encryption allows the data to be transmitted and stored onto all the network nodes within the blockchain. However, only the network nodes having proper authorization to decrypt the data may view and access the encrypted data. In this way, sensitive data (e.g., social security number, health record, and the like) may be included within the blockchain without compromising the participant's privacy.

The analytics server may encrypt private data using an asymmetrical encryption method. For instance, data indicated as private by a network node may be encrypted using said network node's public key. As a result, when attempting to decrypt the same data, the analytics server may request the network node's private key. Therefore, only a network node having access to a private key may be able to view the encrypted data.

The analytics serve may also utilize the multiple private or public keys as an authentication (e-signature) method to illustrate individuals who have accessed or performed an action within the blockchain. For example, the analytics server may generate a distinct and unique private key for each administrator associated with each network node. The analytics server may generate such key using the administrator's unique identification stored in the system database (or received from a network node). The analytics server may also require the administrator to input their unique private key in an input field within the graphical user interface provided by the analytics server in order to perform any actions within the blockchain.

The analytics server may, upon performing the requested action, store the unique private key and/or a timestamp indicating the network node, the requested actions, and the time of action into the block instance. This information may be public and visible to other network nodes. For example, another network node may be able to examine each public block instance and determine the administrator who generated said block instance or modified/updated it. In some embodiments, the analytics server may be configured to communicate with other distributed ledger/blockchain managers (not shown) in a network of blockchains to provide for consensus or other safeguards that ensure that data being added to or otherwise being altered in the distributed ledger is allowable.

The analytics server may use known methods in the art to generate the blockchain key for each network node. For example, the blockchain key may be a randomly generated alphanumerical string of characters and/or other values, such as the following:

User's blockchain key: 1NPrfWgJfkANmd1jt88A141PjhiarT8d9U

The analytics server may generate more than one blockchain key for different parties associated with a blockchain (e.g., different network nodes). The analytics serve may utilize the multiple blockchain keys as an authentication (e-signature) method to illustrate individuals who have accessed or performed an action within the blockchain. For example, the analytics server may generate a distinct and unique blockchain key for each administrator associated with each network node. The analytics server may generate such blockchain key using the administrator's unique identification stored in the system database (or received from a network node). The analytics server may also require the administrator to input their unique private blockchain key in an input field within the graphical user interface provided by the analytics server in order to perform any actions pertinent to the blockchain.

For example, a user may need his key in order to check his balance or log into his blockchain wallet. The analytics server may, upon performing the requested action, store the unique blockchain key and/or a timestamp indicating the administrator, the requested actions, and the time performed into the block instance. This information may be public and visible to other network nodes. For example, another network node may be able to examine each public block instance and determine the administrator who generated said block instance or modified/updated it. In some embodiments, the analytics server may be configured to communicate with other distributed ledger/blockchain managers (not shown) in a network of blockchains to provide for consensus or other safeguards that ensure that data being added to or otherwise being altered in the distributed ledger is allowable.

At step 206, the analytics server may divide the blockchain key into key segments. The analytics server may divide the blockchain key into a plurality of key segments, wherein each key segment comprises a second string of at least one of alpha numerical values and characters, wherein the second string is a part of the second string, wherein the dividing of the key into a plurality of key segments is based on a first encryption method. The analytics server may divide the blockchain key based on a predetermined algorithm and/or based on a method received from the user. In a non-limiting example, the analytics server may receive an instruction from the client computing device operated by the user to divide the blockchain key into two key segments. The analytics server may generate two key segments, each containing a portion of the blockchain key string. For example, the analytics server may generate two key segments of (1NPrfWgJfkANmd1jt8) and (8A141PjhiarT8d9U) from the key illustrated above (e.g., 1NPrfWgJfkANmd1jt88A141PjhiarT8d9U).

The analytics server may use various pre-determined or received methods to divide the key into key segments. For example, the analytics server may determine the number of key segments at random, receive the number from a network node, or determine the number based on a security level associated with the blockchain. For instance, a financial blockchain may need a higher level of security and the analytics server may determine a high number for the key segments (e.g., 100 key segments). On the other hand, the analytics server may assign a fewer number of key segments for a blockchain containing less sensitive data (e.g., 5 key segments for an employment blockchain). In some configurations, the analytics server may determine the number of key segments based on a number of network nodes of a blockchain. Furthermore, the analytics server may determine how to divide the alphanumerical string within the blockchain key into sub-strings of key segments based on a predefined method or at random. For example, the analytics server may equally divide a string of 18 characters into two sub-strings of 9 characters or unequally divide the same string into a sub-string of 15 characters and another sub-string of 3 characters.

At step 208, the analytics server may encrypt each key segment based on an encryption method or algorithm. Encryption, as used herein, is the process of encoding the key segments in such a way that only the analytics server (or another computing device authorized by the analytics server) can access the key segment. In an embodiment, the analytics server may encrypt the string within each key segment using an encryption method and generate ciphertext that can only be read if decrypted. The analytics server may use an encryption scheme that uses a pseudo-random encryption key generated by a pre-determined method. The analytics server may use any of the encryption or cryptography methods known in the art to encrypt the key segments strings. The analytics server may determine the encryption methods and the cryptography methods from an encryption and cryptography methods stored in a key storage database, such as the key storage database 110c illustrated in FIG. 1. In some configurations, the analytics server may use the same encryption method for all the key segments or use different encryption methods for different segments of the same key.

At step 210, the analytics server may retrieve the latest valid blockchain, wherein the valid blockchain is confirmed by the network nodes. As explained above, the analytics server may poll the network nodes associated with the blockchain instances (e.g., generate and transmit an instruction to each node and receive the latest block instances stored within each network node) within the user's blockchain and determine the latest valid blockchain. The analytics server may receive one or more block instances from each node (including hash values for each block instance within the blockchain) and compare the hash values (or other attributes within the block instances). Upon the number of positive matches satisfying a threshold, the analytics server may assume that the received blockchain is accurate.

Figure 3:
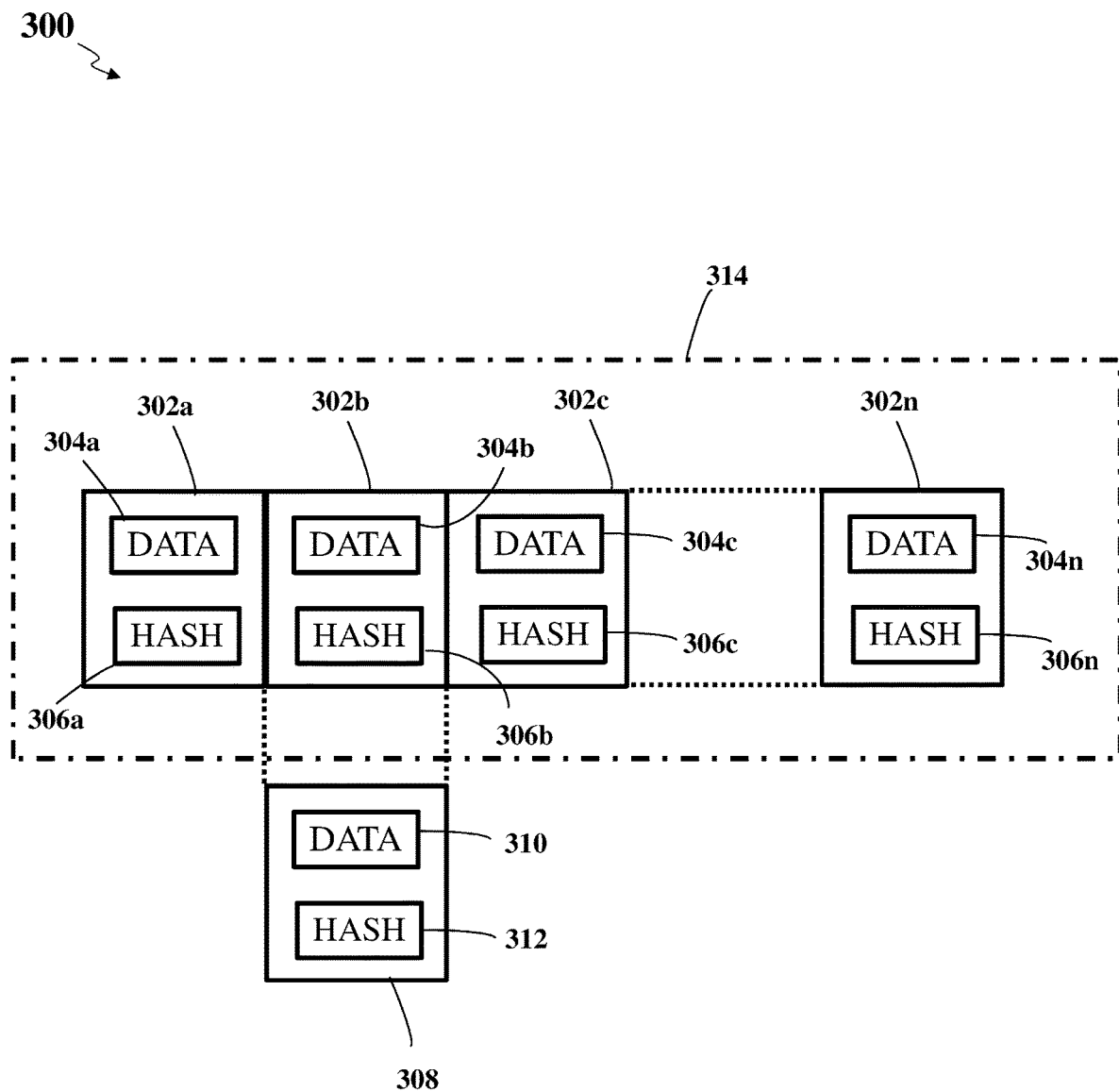
FIG. 3 graphically illustrates an example of a blockchain, according to an embodiment.

For example, and referring to FIG. 3, the analytics server may receive the block instance 302a from the first network node (true content owner of the block instance) and a copy of the same block instance from a second network node and another copy from a third network node. If the hash values of the received block instances match (or the number of positive matches satisfy a predetermined threshold), then the analytics server may assume that the received block instances are truly the latest and most valid of the blockchain instances. The analytics server may do this query and check for every block instance (or a predetermined number or ratio of the block instances) within the blockchain. The analytics server may use a predetermined threshold for determining the latest valid blockchain.

In some configurations, the analytics server may query the network nodes for the latest blockchain instance. If the analytics server receives the same blockchain from 51% of the network nodes, the analytics server may determine that the received blockchain is the latest valid blockchain. The predetermined threshold is set upon the level of integrity required for the data and instructions stored in the analytics server or the blockchain. In some embodiments, the analytics server may receive the level of integrity (e.g., the threshold to determine the latest valid blockchain) from the user, and/or any other network node associated with the blockchain. The analytics server may use a higher predetermined threshold for data requiring a higher level of security and integrity, for example, electronic money transfers. While the present embodiment only describes two computing device for the simplicity purposes, the user's blockchain may include several computer nodes.

The analytics server may use the latest valid blockchain to determine the network nodes associated with the user's blockchain. The analytics server may select a pre-determined number of network nodes that are associated with the latest valid blockchain. For example, if a hash value received from a network node is not consistent with the hash value of the latest valid blockchain, the analytics server may not include said network nodes within the selected group of network nodes. The analytics server may use pre-determined criteria to select one or more network nodes. The analytics server may also select the network nodes based on the number of the block instances possessed by each network node within user's blockchain. For example, a network node may possess or be otherwise associated with 50 block instances compared to another network node that may only possess or otherwise be associated with 5 block instances. The analytics server may use a number or a percentage of the block instances possessed in relation to the total number of block instances within the blockchain threshold to select the predetermined number of network nodes.

Referring back to FIG. 2, at step 212, the analytics server may generate an instruction to the one or more network nodes to locally store the encrypted key segments. The analytics server may generate and transmit an instruction to each network node within the selected group of network nodes (step 210). The analytics server may use a predetermined algorithm to determine which encrypted key segment should be stored in which network node. Additionally, the analytics server may also assign the network nodes to each encrypted key segment at random or use a round robin within the selected group of network nodes.

Figure 5:
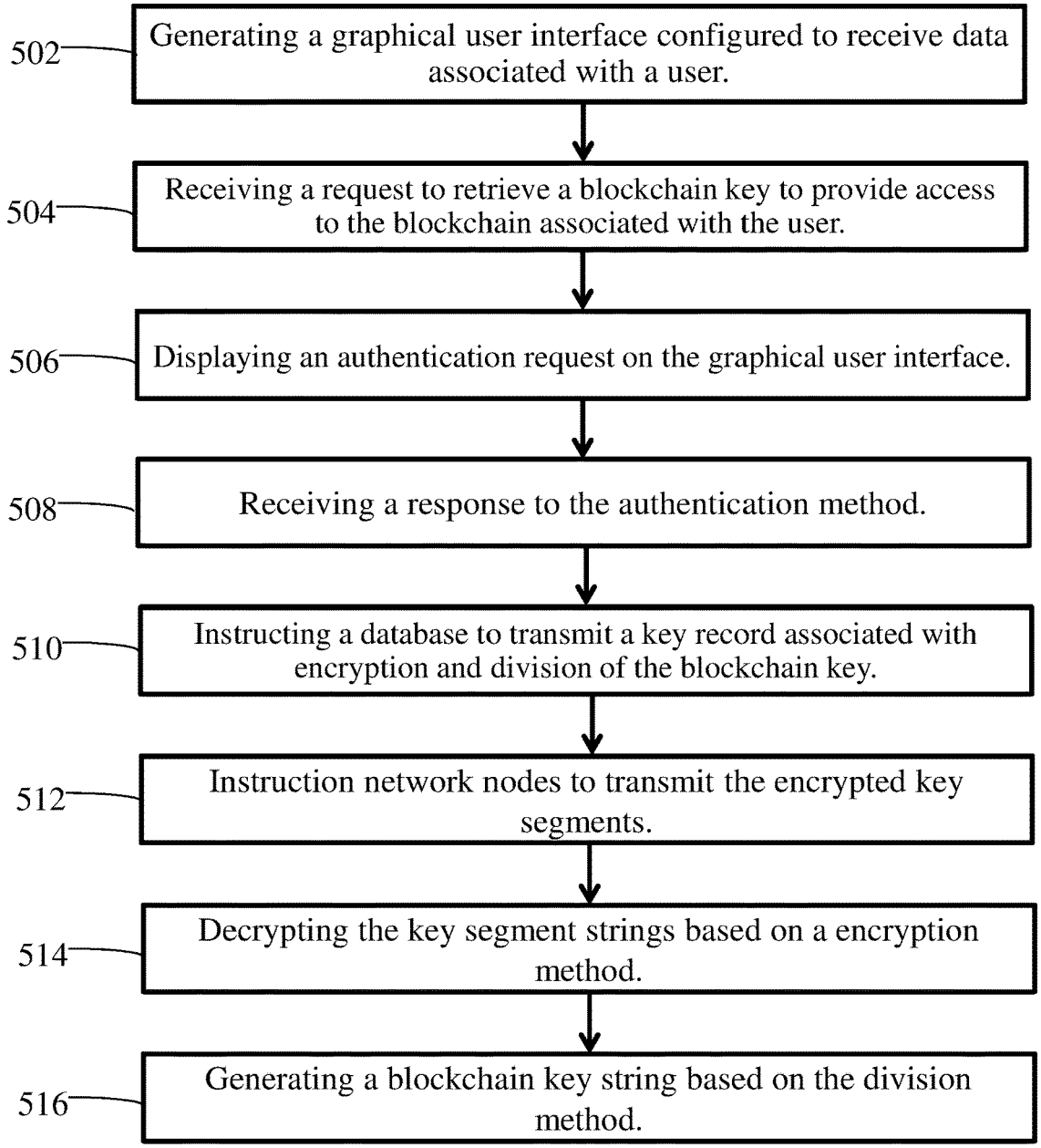
FIG. 5 illustrates a flowchart depicting operational steps for accessing and retrieving the secure blockchain key, according to an embodiment.

At step 214, the analytics server may generate a key record in a database, such as the key storage database 110c. The analytics server may generate a key record in a system database configured to store a plurality key records and comprising one or more data fields containing the plurality of key segments, the first encryption algorithm, and the second encryption algorithm. The analytics server may store the key segment dividing methods, key segment number, key segment string address, the corresponding network nodes onto which the key segment is stored, and respective key encryption methods used for each key segment in an internal database such as the key storage database 110c illustrated in FIG. 1. The analytics server may later retrieve the algorithms and encryption methods in order to retrieve the secure blockchain key and present said key to the user. In some other embodiment, the analytics server may store the encryption methods, key segment number, key segmentation method, and/or the corresponding possessing network node into a different network node. The key record may act as a guide when retrieving the blockchain key (FIG. 5). Therefore, it may include all the necessary information needed to re-create the blockchain key.

In some configurations, the analytics server may distribute the encrypted key segments within the blockchain itself. The analytics server may generate a hash value based at least on one of the user, the encrypted key segment, and/or the first computing device, according to a hashing algorithm. The analytics server may generate and update one or more block instances with the hash value, wherein the block instance is stored within the selected group of network nodes (or in a database associated with the selected group of network nodes). The hash value may be non-interactive and/or may have no secret/encryption keys that have to be managed by a central server or any other relying party (e.g., the analytics server or another central server).

The hash value may be a cryptographic hash function. For example, the hash value may be a string of alphanumerical values. The analytics server may transmit the hash value to the selected group (or all) of network nodes. In some embodiments, the analytics server may hash portions of the first block instance separately to create intermediate hash values and generate a final hash value based on the intermediate hash values. The analytics server may store the hash value in an internal database to be verified or retrieved later. The analytics server may append the generated block instance (corresponding to the encrypted key segments) to the block instances of the latest valid blockchain by transmitting the generated block instances corresponding to the encrypted key segments to the selected group of network nodes. As illustrated above, the encrypted key segments can be stored directly onto the selected network nodes or be stored onto the blockchain itself.

The analytics server may periodically re-encrypt, re-distribute, and/or regenerate the blockchain key. For example, the analytics server may retrieve the blockchain key (FIG. 5) and divide the key based on a different method, re-encrypt based on a different encryptions method, and re-distribute to other network nodes (e.g., not previously used to store encrypted key segments). The analytics server may use pre-determined time intervals for the re-distribution or receive time interval from a user.

Referring now to FIG. 3, an example of the user's blockchain comprising different block instances is illustrated. As depicted in FIG. 3, a blockchain 314 comprises block instances 302a-302n (collectively 302) may include data 304a-304n (collectively 304) that enables information, machine-readable code/documents, and other metadata associated with a user. Also contained in the blockchain instances are hash values 306a-306n (collectively 306) that are used to link each of the block instances to the preceding blockchain instances or blockchain formed by the preceding blockchain instances, as understood in the art.

As explained above, the analytics server may generate (or instruct a blockchain service to generate) the block instance 302a. The analytics server may receive data 304a from the first computing device (e.g., first network node) via GUI provided by the analytics server on the first network node. For example, an administrator using the first computing device may log in the website hosted or otherwise managed by the analytics server and transmit data 304a to the analytics server. Upon generation of block instance 302a, the analytics server may generate hash value 306a based on the data 304a, the first network node (e.g., the first computing device), identifier information (e.g., time stamp and/or geo-location), and/or an identification of the user.

The analytics server may also generate (or instruct a blockchain service to generate) the block instance 302b. The analytics server may receive data 304b from a second computing device (e.g., second network node) via GUI provided by the analytics server on the second computing device. For example, an administrator using the second computing device may log in a website hosted or otherwise managed by the analytics server and transmit data 304b to the analytics server. The analytics server may also generate hash value 306b based on the data 304b, the second network node (e.g., identifier information such as time stamp, geolocation, and/or a computing device identifier), and/or a reference to the system database associated with the analytics server. The hash value 306b may also include information regarding the hash value 306a. The analytics server may incorporate the hash value 306a into the hash value 306b in order to append the block instance 302b to the block instance 302a (step 218 of FIG. 2).

The analytics server may subsequently poll all the network nodes in order to ensure the highest integrity of the blockchain by appending the latest block instance to the latest valid blockchain instances. Using this method blockchain instances within the block chain 314 may be appended to the preceding blockchain instance. The analytics server may generate block chain instance 302c-n using the same methods explained above in order to continuously update blockchain 314. As depicted, block instances 302a, 302b, 302c, and 302n are connected because of synchronization of hash values 306a, 306b, 306c, and 306n. The analytics server may also transmit the blockchain instances to all the network nodes within the blockchain in order to preserve the integrity of the blockchain. For example, the analytics server may transmit the hash value 306c (e.g., the hash value generated for block instance 302c based on data 304c received from a third node) to the first network node (e.g., the first computing device storing the block instance 302a) and the second network node (e.g., the second computing device storing the block instance 302b). In some embodiments, the analytics server may append block instances comprising one or more encrypted key segments to the blockchain. For example, the analytics server may generate block instance 302c comprising data 304c, which may include an encrypted key segment.

Additional information, such as an identifier associated with network nodes adding or updating the data could also be included within the blockchain or incorporated within the hash value. As an example, if a network node modifies or adds any data to the blockchain, an identifier associated with the computing device who contributed to creating or modifying the data may be included in the respective block. In some embodiments, the identifier may include a time stamp (e.g., data regarding the time of data modification or creation) and/or a geolocation (e.g., data regarding the location within which the data modification or creation has occurred). The identifier may also be incorporated within the hash value and may be used by the analytics server as a part of the hashing algorithm. Such identification information may be used (for example by the analytics server) as a veracity scale factor that the information is true and accurate.

Modification of data within a block instance may disconnect that block instance from the blockchain. The analytics server may use this method to combat possible fraud or unauthorized modification of the data within blockchain instances. For example, if the second administrator using the second computing device modifies data 304b within block instance 302b, the hash value 306b will also be modified. As explained above the hash value 306b may be based on (or at least partially based on) data 304b. Therefore, if data 304b is modified to data 310, hash value 306b will also be modified to hash value 312. Modification of hash value 306b to hash value 312 may break the link between block instance 302b and block instance 302c. The analytics server may generate a new block instance 308 including the modified data 310 and a newly generated hash value 312. However, the analytics server may be unable to append or include the newly generated block instance 308 within the blockchain 314. The analytics server may append block instance 308 to block instance 302b by linking hash value 312 to hash value 306b (e.g., generating the hash value based (at least partially) on hash value 306b.

In operation, the analytics server may encounter such modification when a network node desires to update or insert additional data. For example, a second network node (e.g., the network node owner of block instance 302b) may be a financial institution associated with the user and may attempt to modify user's account data. Since the analytics server protects the integrity of the blockchain, the analytics server may not allow the second network node to simply modify data 304b. The analytics server may provide the second network node the option to generate a new block instance (e.g., the block instance 308) and append to the second network node's previous block instance (block instance 302b). The analytics server may also transmit the block instance 308 to all the network nodes within blockchain 314; therefore, while all the network nodes within the blockchain 314 are aware of the block instance 308, they are also aware that block instance 308 contains updated and modified data. In some embodiments, the analytics server may poll all the existing network nodes within the blockchain before appending the block instance 308 to block instance 302b.

Figure 4:
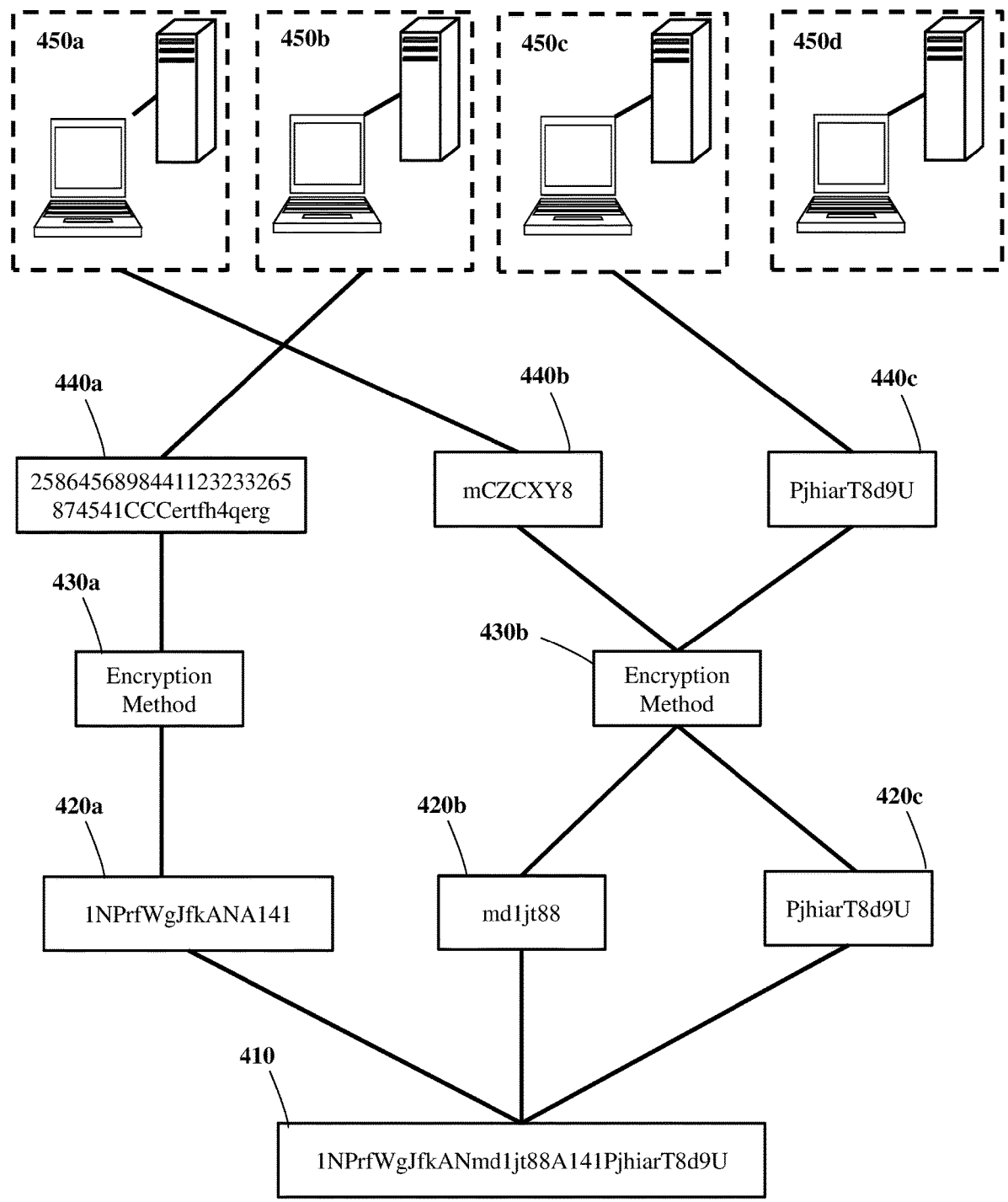
FIG. 4 graphically illustrates an example of encrypting and distributing a blockchain key, according to an embodiment.

Referring now to FIG. 4, an example of encryption and distribution of the secure blockchain key is illustrated. As stated above (e.g., steps 202-4), the analytics server may generate a blockchain key 410 for a user (upon receiving a request form the user computing device/network node) and display the key on a user interface provided by the analytics server on the user's computing device. The blockchain key 410 may include a string of alphanumerical and/or character values, such as "1NPrfWgJfkANmd1jt88A141PjhiarT8d9U." The analytics server may then divide the string of blockchain key 410 into different key segments 420a-c based on a pre-determined method.

Each key segment 420a-c may contain an equal number of alphanumerical strings. In some other embodiments, the key segments may include an unequal number of digits or alphanumerical string. For example, key segment 420a contains more characters than key segments 420b-c. The analytics server may then encrypt each key segment. The analytics server may encrypt each key segment string separately or together. In an embodiment, the analytics server may use a pre-determined encryption method and encrypt all the key segments 420a-c using the same encryption method stored in the key storage database. For example, the analytics server may use encryption method 430a to encrypt the content of key segment 420a in order to generate encrypted key segment 440a. Moreover, the analytics server may use encryption method 430b to encrypt the content of key segments 420b-c in order to generate encrypted key segments 440b-c. In some other embodiments, the analytics server may randomly choose the encryption method (from a variety of encryption methods stored in the key storage database), use a round robin method, or use the same encryption method for all the key segments 420a-c.

The analytics server may then determine one or more network nodes associated with a latest valid blockchain (associated with the user's blockchain) and instruct each network node to store the encrypted key segment. For example, the analytics server determines that network node 450a is associated with the block instance 302a, network node 450b is associated with the block instance 302b, and network node 450c is associated with the block instance 302c. Upon this determination, the analytics server may store (or instruct to store) the encrypted key segment 440a onto the network node 450b, the encrypted key segment 440b onto the network node 450a, and the encrypted key segment 440c onto the network node 450c. The analytics server may choose the network nodes at random or use a pre-determined algorithm to select the network nodes. The analytics server may not transmit an encrypted key segment to all the network nodes associated with the latest valid blockchain. For example, the analytics server identifies the network node 450d as a network node associated with the latest valid blockchain; however, the analytics server does not transmit any encrypted key segments to network node 450d. In some embodiments, the analytics server may store more than one encrypted key segment onto a network node. For example, in an embodiment, the analytics server may instruct the network node 450c to store encrypted key segments 440a-b. The analytics server may then store the blockchain key dividing method, encryption method, and the network nodes within which the encrypted key segments are stored in a database, such as the key storage database 110c (or another network node such as the network node 450d), as described in FIG. 1.

As described above, each encrypted key segment may also be appended to the blockchain as a block instance. For example, the analytics server may divide the blockchain key into three key segments, encrypt each key segment, and append each encrypted key segment to the blockchain itself. The analytics server may encrypt the key segments in a manner that is not accessible or viewable by any of the network nodes.

FIG. 5 illustrates execution of a method 500 for accessing and retrieving a secure blockchain key, according to an embodiment. Other embodiments may comprise additional or alternative steps, or may omit some steps altogether.

At step 502, the analytics server may generate a graphical user interface comprising a plurality of input fields configured to receive data associated with a user. The analytics server may generate the graphical user interface in order to provide blockchain services to variety of clients. In an embodiment, the graphical user interface may be a website hosted by the analytics server, which is available to different clients (e.g., network nodes). The purpose of said website may be to collect user's information, provide a platform to securely upload pertinent data, and/or possibly retrieve user's data from the website. The graphical user interface may act as an intermediary between different parties involved within the user's blockchain and may be a central and "one stop" place for adding, updating, and/or retrieving user's data. In an embodiment, the analytics server manages a blockchain associated with the user's financial information (e.g., financial blockchain). The user and other network nodes (e.g., different financial institutes) may have access to the website provided by the analytics server in order to update and/or modify user's blockchain. While the graphical user interface is described herein as a central management tool, neither the analytics server nor the graphical user interface deviates from the spirit of the distributed nature of the blockchain technology.

At step 504, the analytics server may receive a request to retrieve a secure blockchain key associated with the user's blockchain. In some embodiments, the user (operating the client computing device) may log into the website hosted by the analytics server to request retrieval of his secure blockchain key. Upon receiving the request, the analytics server may retrieve the blockchain key for the user and display such blockchain key on the user interface. The blockchain key may refer to a blockchain key generated by the analytics server, generated by the user himself, or generated by a third computing device. The analytics server may retrieve and restore any blockchain key if the analytics server has securely stored it in accordance with the above-mentioned methods.

At step 506, the analytics server may display an authentication request on the graphical user interface. The analytics server may update the graphical user interface (provided in steps 502-4) to display an authentication request. An authentication request may refer to an input field configured to request inputs from the user in order to authenticate the user. Upon displaying the authentication request, the analytics server may receive an input from the user's client computing device (step 508). The analytics server may retrieve a data record from an internal database (such as the system database 110b) that corresponds to the authentication request (e.g., the analytics server may authenticate the user). Upon the data record matching the input received from the user, the analytics server may move to step 510. The analytics server may display one or more authentication requests and may authenticate the user using one or more authentication methods.

The analytics server may choose the authentication requests and methods at random, based on pre-determined user preferences, or based on a pre-determined method. The predetermined method may be a dynamic method. In some configurations, the analytics server may adjust the pre-determined method in accordance with a sensitivity level associated with the blockchain. As described above, the analytics server may assign a higher sensitivity level for blockchains containing more sensitive data (e.g., financial blockchains). The analytics server may determine different authentication levels based on this sensitivity level. For example, the analytics server may display a higher number (e.g., pre-determined number) of authentication methods for a highly sensitive blockchain.

In an embodiment, the analytics server may display a media element on the graphical user interface to authenticate the user. The analytics server may display any media element, such as images (e.g., GIF, JPEG, TIFF, PNG, and BMP), videos (e.g., AVI, QuickTime, and Windows Media), stickers, and/or ideograms (e.g., EMOJIs). The analytics server may then request the user indicate a specific frame, or a portion of the media element (e.g., a moment of significance) within the media element. For example, the analytics server may require the user to pause a video at a particular point or click on a specific area within an image. Upon the analytics server receiving the paused video frame, from the user computing device, the analytics server may compare the received paused frame with a previous frame received from the user (e.g., stored in the system database 110b or any other internal or external database). The analytics server may use this "video pausing" method to authenticate the user.

In another embodiment, the analytics server may query and identify a Globally Unique Identifier, MAAC Address, IP address, or any other electronic device identifier associated with the client-computing device and match the identifier with a previously stored identifier (e.g., stored in the system database 110b or any other internal or external database) in order to authenticate the user. A user may register his electronic device (e.g., personal computer, work computer, laptop, table, mobile device) with the analytics server. The analytics server may then store the device identifier in a database, such as an internal database (e.g., system database 110b). Upon receiving a request to retrieve a blockchain key, the analytics server may query the device identifier with which the user has accessed the graphical user interface (e.g., the blockchain website) and use the identifier as an authentication method.

In another embodiment, the analytics server may request the user to move his mouse or any other input device (if the user is connected to the analytics server via a computing device that utilizes a mouse) in a pre-determined position. The analytics server may then compare the mouse movement of the user with a pre-determined user defined mouse movement stored in a database, such as an internal database (e.g., system database 110b). For instance, the user may have chosen a "smiley face" as an authenticator. When the user requests access to the blockchain while not having his private key, the analytics server requests that the user draws an authenticating image on the screen or using the mouse. If the user draws a smiley face, the analytics server may authenticate the user and grant the user access to the blockchain, as described below.

In another embodiment, the analytics server may query and identify a location identification associated with a global positioning system coordinates of the user's computing device and match the GPS location with a previously stored GPS location, in order to authenticate the user. For instance, a user may register a specific location with the analytics server. The analytics server may then store GPS data associated with the location in a database, such as an internal database (e.g., system database 110b). The analytics server may query the location of the computing device with which the user has accessed the graphical user interface provided by the analytics server (e.g., the blockchain website or GUI). The analytics server may then use the location data as an authentication method. The analytics server may only authenticate a user if the user is accessing the graphical user interface from the predetermined location.

In another embodiment, the analytics server may use an eye tracking or an expression sensor device within the user's computing device (or otherwise associated with the user's computing device) to authenticate the user. An eye-tracking sensor module and the expression sensor module are configured to track the gaze and expressions of the user as the analytics server presents the graphical user interface (or the authentication request). The eye-tracking sensor module may provide ocular and/or non-ocular sensor data to the analytics server. The eye-tracking sensor may use a variety of methods to obtain the user's eye movement and/or gaze. In one embodiment, light (e.g., infrared emitted by the eye-tracking sensor) is reflected from the user's eyes. The eye-tracking sensor may then receive the corneal reflection and use said reflection to determine a location within the display screen at which the user is gazing. In one implementation, the eye-tracking sensor can use a dark-pupil technique, whereby if the illumination source is offset from the optical path, then the pupil appears dark as the retro reflection from the retina is directed away from the camera. In another implementation, the eye-tracking module can use a bright-pupil technique, whereby if the illumination is coaxial with the optical path, then the eye acts as a retro reflector as the light reflects off the retina creating a bright pupil effect. The expression sensor may provide the expression sensor data to the analytics server using variety of methods known in the art. Upon displaying the authentication request on the graphical user interface, the analytics server may generate and transmit an instruction to the eye-tracking sensor and/or expression sensor devices and activate said sensors.

The analytics server may use the data received from the above-mentioned sensors to authenticate the user. For example, a user may choose a specific facial expression (e.g., smile) as an authentication method. The analytics server may display an authentication request comprising a message to the user to show an emotion. The analytics server may then activate an expression sensor associated with the user computing device (e.g., an application or software associated with the electronic device used by the user). The analytics server may authenticate the user, upon receiving expression data from the expression sensor that the user is smiling.

In another embodiment, the analytics server may prompt the user to look at a certain area within the display screen of the user's computing device. The analytics server may then activate an eye-tracking device. Upon receiving data, from the eye-tracking device, that the user's gaze is consistent with a pre-determined location of the screen stored in a database (e.g., system database 110b), the analytics server may authenticate the user. For example, a user may choose the top left corner of the screen as an authentication location. The analytics server may store said location in a database. Upon the analytics server displaying an authentication request (e.g., prompting the user to look at the screen) the analytics server may activate the eye-tracking device associated with the user's computing device. Upon the user looking at the top left corner of the screen, the analytics server may authenticate the user and/or display a message that the user has been authenticated. In another embodiment, if the user is gazing at a different location (e.g., bottom right corner), the analytics server may display a message indicating that the user has not been authenticated.

Additionally or alternatively to the above-mentioned authentication methods, the analytics server may use a static or dynamic passcode (e.g., a passcode selected by the user or a changing passcode, such as a token-based dynamic passcode) in order to authenticate the user. In some configurations, the analytics server may use one or two of the above-mentioned authentication methods to authenticate the user.

At step 510, the analytics server, upon positively authenticating the user, may instruct a database to transmit a key record associated encryption and division of the blockchain key. The analytics server may generate and transmit an instruction to receive a key record associated with the user. The key record may include the first and the second encryption methods (as described in steps 206 and 208 of FIG. 2) and the address associated with different network nodes in which the encrypted key segments have been stored. The analytics server may transmit the instruction to an internal (e.g., key storage database 110c) or an external database.

At step 512, the analytics server may instruct one or more network nodes to transmit the encrypted key segments. Based on the received key records, the analytics server may identify one or more network nodes that have stored the encrypted key segments. The analytics server may then generate and transmit an instruction to the network nodes to transmit the encrypted key segments. For example, and referring to FIG. 4, the analytics server may identify that key segments 440a-c are stored within network nodes 450a-c. Upon this identification, the analytics server may transmit the instruction to network nodes 450a-c and receive the encrypted key segments 440a-c.

At step 514, the analytics server decrypt the key segment strings based on the encryption method used. Upon receiving the encrypted key segments from the identified networks (step 512), the analytics server may use the second encryption method (step 208 described in FIG. 2) to decrypt the received encrypted key segments. For example, and referring to FIG. 4, the analytics server may use encryption methods 430*a*-*b* (received from the key storage database 110*c*) to decrypt the encrypted key segments 440*a*-*c* into key segments 420*a*-*c*.

In some embodiments, the analytics server may store multiple copies of the same encrypted key segments into different network nodes. For instance, network nodes 450*a* and 450*d* (described in FIG. 4) may store the same encrypted key segment. When retrieving the key, the analytics server may first identify whether any of the network nodes has been compromised. If so, the analytics server may only decrypt the encrypted key segment stored onto the uncompromised network node. For instance, the analytics server may retrieve a latest valid blockchain and determine that network node 450*d* does not possess the latest valid blockchain. The analytics server may then only decrypt the encrypted key segment stored within the 450*a* network node.

At step 516, the analytics server may generate a blockchain key string based on the division method used. Upon decrypting the encrypted key segments based on the received encryption methods (step 514), the analytics server may append the key segments in accordance with the first encryption method (e.g., append the strings associated with each key segment) in order to generate a blockchain key. For example, and referring to FIG. 4, the analytics server may append key segments 420*a*-*c* in order to generate blockchain key 410. The analytics server may then display the blockchain key on the graphical user interface associated with the user's computing device or otherwise transmit the blockchain key to the user computing device or any other computing device selected by the user.

The methods and systems disclosed herein decrease the chances of data compromise in case of a cyber-attack by storing encrypted key segments in multiple network nodes or block instances. For example, even if a cyber-attacker is successful and infiltrates into an internal database (e.g., key storage database or the system database), the method and systems described herein force the cyber-attackers to determine the dividing patterns of the key segments, the encryptions patterns of the key segments, and the network nodes possessing the encrypted key segments. The cyber attacker is then forced to infiltrate each and every network node possessing the encrypted key segments, which may be very difficult and/or impossible to accomplish.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An encryption method comprising:
generating, by a server, a blockchain key configured to grant access to a set of data embedded within a blockchain, the blockchain key comprising a first string of alpha numerical and character values;
generating, by the server, a plurality of key segments by dividing, based on a first encryption method, the first string of alpha numerical and character values into a plurality of second strings, each second string comprising at least a portion of the first string of alpha numerical and character values;
encrypting, by the server, each key segment based on a second encryption method;
retrieving, by the server, a latest valid blockchain from a plurality of network nodes associated with the blockchain, the latest valid blockchain comprising one or more block instances comprising blockchain data and a corresponding cryptographic hash value, each block instance stored in a database associated with at least one of the plurality of network nodes;
generating, by the server, an instruction to store at least one of the plurality of the encrypted key segments; and
transmitting, by the server, the instruction and at least one encrypted key segment to at least one network node.

2. The method of claim 1, further comprising:
generating, by the server, a key record in a system database configured to store a plurality of key records and comprising one or more data fields containing the plurality of key segments, the first encryption method, the second encryption method, and an address of the plurality of network nodes.

3. The method of claim 1, wherein multiple copies of an encrypted key segment are stored on different network nodes.

4. The method of claim 1, wherein the second encryption method is different for each encrypted key segment.

5. The method of claim 1, wherein the second encryption method is predetermined by the server.

6. The method of claim 1, wherein a number of key segments are determined based on a third encryption method.

7. The method of claim 1, wherein the plurality of encrypted key segments are stored onto a subset of the plurality of network nodes.

8. The method of claim 1, wherein a number key segments are determined based on a number of the plurality of network nodes.

9. The method of claim 1, wherein a number network nodes storing at least on encrypted key segment is determined, by the server, at random.

10. The method of claim 1, wherein the blockchain key is received, by the server, from a computing device.

11. A computer system for data encryption, the computer system comprising:
a plurality of network nodes, each network node configured to store a block instance of a blockchain;
a server communicatively coupled to each network node, the server configured to:
generate a blockchain key configured to provide access to a set of data associated with the blockchain, the blockchain key comprising a first string of alpha numerical and character values;
generate a plurality of key segments by dividing, based on a first encryption method, the first string of alpha numerical and character values into a plurality of second strings, each second string comprising at least a portion of the first string of alpha numerical and character values;
encrypt each key segment based on a second encryption method;
retrieve a latest valid blockchain from the plurality of network nodes associated with the blockchain, the latest valid blockchain comprising one or more block instances comprising blockchain data and a corresponding cryptographic hash value, each block instance stored in a database associated with at least one of the plurality of network nodes;
generate an instruction to store at least one of the plurality of the encrypted key segments; and
transmit the instruction and at least one encrypted key segment to at least one network node.

12. The system of claim 11, wherein the server is further configured to:
generate a key record in a system database configured to store a plurality of key records and comprising one or more data fields containing the plurality of key segments, the first encryption method, the second encryption method, and an address of the plurality of network nodes.

13. The system of claim 11, wherein multiple copies of an encrypted key segment are stored on different network nodes.

14. The system of claim 11, wherein the second encryption method is different for each encrypted key segment.

15. The system of claim 11, wherein the second encryption method is predetermined by the server.

16. The system of claim 11, wherein a number of key segments are determined based on a third encryption method.

17. The system of claim 11, wherein the plurality of encrypted key segments are stored onto a subset of the plurality of network nodes.

18. The system of claim 11, wherein a number key segments are determined based on a number of the plurality of network nodes.

19. The system of claim 11, wherein a number network nodes storing at least on encrypted key segment is determined, by the server, at random.

20. The system of claim 11, wherein the blockchain key is received, by the server, from a computing device.

* * * * *